United States Patent
Mohr et al.

(10) Patent No.: US 11,578,656 B2
(45) Date of Patent: Feb. 14, 2023

(54) AIR FILTRATION ASSEMBLIES FOR GAS TURBINE SYSTEMS AND METHODS FOR FILTERING INTAKE AIR IN GAS TURBINE SYSTEMS

(71) Applicant: General Electric Company, Schenectady, NY (US)

(72) Inventors: Wolfgang Franz Dietrich Mohr, Niederweningen (CH); Joerg Pfistner, Wettingen (CH); Kamel Tayebi, Dhahran (SA); Murali Krishna Kalaga, Salmiya (KW); Rebecca Evelyn Hefner, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 411 days.

(21) Appl. No.: 16/774,675

(22) Filed: Jan. 28, 2020

(65) Prior Publication Data
US 2021/0231053 A1    Jul. 29, 2021

(51) Int. Cl.
*F02C 7/052* (2006.01)
*B01D 46/00* (2022.01)
(Continued)

(52) U.S. Cl.
CPC .......... *F02C 7/052* (2013.01); *B01D 46/0032* (2013.01); *F02C 7/04* (2013.01);
(Continued)

(58) Field of Classification Search
CPC .... F02C 7/04; F02C 7/05; F02C 7/052; F02C 7/055; B01D 64/0032; B01D 2279/60;
(Continued)

(56) References Cited

U.S. PATENT DOCUMENTS 3,874,858 A    4/1975    Klugman et al.
3,958,958 A    5/1976    Klugman et al.
(Continued)

FOREIGN PATENT DOCUMENTS

CN    113250823 A    8/2021
DE    102011001293 A1    12/2011
(Continued)

OTHER PUBLICATIONS

European Search Report issued in connection with corresponding EP Application No. 21151036.7-1104, dated May 31, 2021, 5 pages.
(Continued)

*Primary Examiner* — Steven M Sutherland
(74) *Attorney, Agent, or Firm* — James Pemrick; Charlotte Wilson; Hoffman Warnick LLC

(57) ABSTRACT

Air filtration assemblies configured to provide instant detection of particles and/or improve particle filtration are disclosed. The assemblies may include an air inlet duct in fluid communication with a compressor of a gas turbine system. The air inlet duct may include an inlet for receiving intake air including intake air particles, and an outlet positioned opposite the inlet. The assembly may also include a plurality of vane filters at the inlet, an array of fabric filters positioned in the air inlet duct, downstream of the vane filters, and a silencer assembly positioned in the air inlet duct, downstream of the fabric filters. Additionally, the assembly may include an electrostatic component positioned in the air inlet duct, downstream of the fabric filters. The electrostatic component may be configured to charge the intake air particles that pass through the vane filters and the fabric filters.

17 Claims, 12 Drawing Sheets

(51) Int. Cl.
*F02C 7/04* (2006.01)
*B64D 33/02* (2006.01)

(52) U.S. Cl.
CPC .. *B01D 2279/60* (2013.01); *B64D 2033/0246* (2013.01); *F05D 2220/50* (2013.01); *F05D 2250/51* (2013.01); *F05D 2260/607* (2013.01); *F05D 2260/96* (2013.01)

(58) Field of Classification Search
CPC ......... B64D 2033/0246; F05D 2220/50; F05D 2250/51; F05D 2260/607; F05D 2260/96
See application file for complete search history.

(56) References Cited

U.S. PATENT DOCUMENTS

| | | | |
|---|---|---|---|
| 7,527,674 | B1 | 5/2009 | Janawitz et al. |
| 2004/0163536 | A1* | 8/2004 | Baudat ..................... F28D 5/00 95/214 |
| 2009/0266048 | A1 | 10/2009 | Schwarz |
| 2012/0324843 | A1* | 12/2012 | Saraswathi ........ B01D 46/2411 55/482 |

FOREIGN PATENT DOCUMENTS

| | | |
|---|---|---|
| EP | 2199571 A2 | 6/2010 |
| EP | 3858458 A1 | 8/2021 |
| JP | 2021116811 A | 8/2021 |
| WO | 1996024760 A1 | 8/1996 |
| WO | 03002861 A1 | 1/2003 |

OTHER PUBLICATIONS

Notice of Publication dated Jul. 7, 2021, for related EP Application 21151036.7, filed Jan. 11, 2021; pp. 2.
Publication for related JP Application 2021000289, filed Jan. 4, 2021; pp. 39.
Notice of Publication dated Aug. 19, 2021, for related CN Application 202011573597.0, filed Dec. 25, 2020; pp. 44.

* cited by examiner

AIR FILTRATION ASSEMBLIES FOR GAS TURBINE SYSTEMS AND METHODS FOR FILTERING INTAKE AIR IN GAS TURBINE SYSTEMS

BACKGROUND

The disclosure relates generally to air filtration assemblies for gas turbine systems, and more particularly, to air infiltration assemblies configured to provide instant detection of particles and/or improve particle filtration.

Gas turbines are used throughout the world in many diverse applications and environments. This diversity creates a number of challenges to the air filtration system, necessitating a different solution for each type of environmental contaminant(s), gas turbine platform technology, and/or fuel quality. For example, gas turbines which operate in deserts or high dust concentration areas, and/or high efficiency gas turbines operating at high operational temperatures, must include a filtration system that prevents undesirable debris or particles (e.g., sand, dust) from entering the gas turbine. When conventional filtration systems fail, and sand and other undesirable particles enter the gas turbine, the components of the gas turbine may become damaged and/or inoperable. Additionally, undesirably particles flowing through components of the gas turbine may reduce the operational efficiency of the gas turbine itself.

To prevent debris and/or particles from entering the gas turbine, the filtration systems typically include multiple stages of filtration components that filter various sizes of debris and/or particles prior to the working fluid (e.g., filtered air) entering the compressor of the gas turbine. However, these components included in conventional filtration systems can become damaged by the same debris and may no longer filter out the debris and particles as desired. Additionally, or alternatively, the components included in conventional filtration systems may not operate as desired (e.g., filter out debris) due to improper installation, extended operation-life or use, and/or other degradation factors. In conventional systems, there is typically no warning or indication system that such filtration components are damaged and/or inoperable. As such, it is only when components of the gas turbine become damaged/altered, and/or when operational efficiency of the gas turbine degrades that an operator of the gas turbine may determine that components of the filtration system need repair and/or replacement. Additionally, in order to repair the damaged filtration components of the filtration system, the filtration system, or even entire gas turbine, must be shut down for maintenance on the damaged filtration components and/or the damaged components of the gas turbine—which can result in a loss of power and/or revenue generation.

BRIEF DESCRIPTION

A first aspect of the disclosure provides an air filtration assembly for a gas turbine system. The air filtration assembly includes: an air inlet duct in fluid communication with a compressor of the gas turbine system, the air inlet duct including: an inlet for receiving intake air including intake air particles; and an outlet positioned opposite the inlet; a plurality of vane filters at the inlet of the air inlet duct; an array of fabric filters positioned in the air inlet duct, downstream of the plurality of vane filters; a silencer assembly positioned in the air inlet duct, downstream of the array of fabric filters, the silencer assembly positioned adjacent the outlet of the inlet duct; and an electrostatic component positioned in the air inlet duct, downstream of the array of fabric filters, the electrostatic component configured to charge the intake air particles that pass through the plurality of vane filters and the array of fabric filters.

A second aspect of the disclosure provides a gas turbine system including: a compressor; and an air filtration assembly in fluid communication with the compressor, the air filtration assembly including: an air inlet duct including: an inlet for receiving intake air including intake air particles; and an outlet positioned opposite the inlet; a plurality of vane filters at the inlet of the air inlet duct; an array of fabric filters positioned in the air inlet duct, downstream of the plurality of vane filters; a silencer assembly positioned in the air inlet duct, downstream of the array of fabric filters, the silencer assembly positioned adjacent the outlet of the inlet duct; and an electrostatic component positioned in the air inlet duct, downstream of the array of fabric filters, the electrostatic component configured to charge the intake air particles that pass through the plurality of vane filters and the array of fabric filters.

A third aspect of the disclosure provides a method for filtering intake air for a gas turbine system. The method includes flowing the intake air including intake air particles through: a plurality of vane filters positioned at an inlet of an air inlet duct in fluid communication with a compressor of the gas turbine system, and an array of fabric filters positioned in the air inlet duct, downstream of the plurality of vane filters; and charging the intake air particles included in the intake air flowing through the plurality of vane filters and the array of fabric filters using an electrostatic component positioned in the air inlet duct, downstream of the array of fabric filters.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
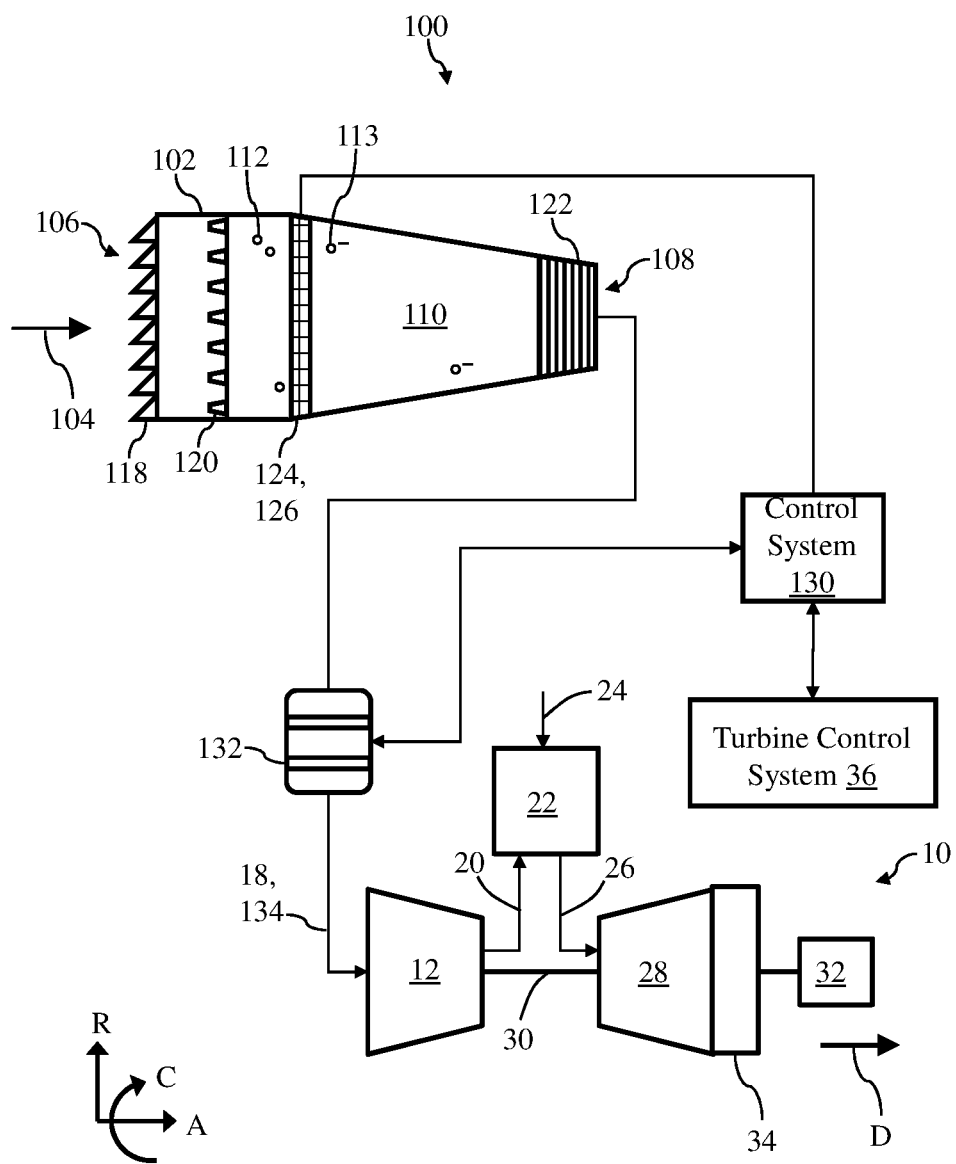
FIG. 1 shows a schematic view of a gas turbine system and an air infiltration assembly including a matrix of ionizers, according to embodiments of the disclosure.

As an initial matter, in order to clearly describe the current disclosure it will become necessary to select certain terminology when referring to and describing relevant machine components within the scope of this disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. Additionally, the terms "leading" and "trailing" may be used and/or understood as being similar in description as the terms "forward" and "aft," respectively. It is often required to describe parts that are at differing radial, axial and/or circumferential positions. The "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position/direction of objects along a direction "R" (see, FIG. 1), which is substantially perpendicular with axis A and intersects axis A at only one location. Finally, the term "circumferential" refers to movement or position around axis A (e.g., direction "C").

As indicated above, the disclosure relates generally to air filtration assemblies for gas turbine systems, and more particularly, to air infiltration assemblies configured to provide instant detection of particles and/or improve particle filtration.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 shows a schematic view of an illustrative gas turbine system 10. Gas turbine system 10 may include a compressor 12 and an air filtration assembly 100 positioned upstream of and in fluid communication with compressor 12. Compressor 12 compresses an incoming flow of filtered air 18 that may be filtered by and flow from air filtration assembly 100 to compressor 12, as discussed herein. Compressor 12 typically includes a plurality of rotatable blades including airfoils (not shown) and stationary nozzles (not shown) which work together to compress filtered air 18 as it flows through compressor 12. Compressor 12 delivers a flow of compressed air 20 to a combustor 22. Combustor 22 mixes the flow of compressed air 20 with a pressurized flow of fuel 24 and combusts the mixture to create a flow of combustion gases 26. Although only a single combustor 22 is shown, gas turbine system 10 may include any number of combustors 22. The flow of combustion gases 26 is in turn delivered to a turbine 28. Similar to compressor 12, turbine 28 also typically includes a plurality of turbine blades including airfoils and stator vanes. The flow of combustion gases 26 drives turbine 28, and more specifically the plurality of turbine blades of turbine 28, to produce mechanical work. The mechanical work produced in turbine 28 drives compressor 12 via a rotor 30 extending through turbine 28, and may be used to drive an external load 32, such as an electrical generator and/or the like.

Gas turbine system 10 may also include an exhaust frame 34. As shown in FIG. 1, exhaust frame 34 may be positioned adjacent to turbine 28 of gas turbine system 10. More specifically, exhaust frame 34 may be positioned adjacent to turbine 28 and may be positioned substantially downstream of turbine 28 and/or the flow of combustion gases 26 flowing from combustor 22 to turbine 28.

Subsequent to combustion gases 26 flowing through and driving turbine 28, combustion gases 26 may be exhausted, flow-through and/or discharged through exhaust frame 34 in a flow direction (D). In the non-limiting example shown in FIG. 1, combustion gases 30 may flow through exhaust frame 38 in the flow direction (D) and may be discharged from gas turbine system 10 (e.g., to the atmosphere). In another non-limiting example (not shown) where gas turbine system 10 is part of a combined cycle power plant (e.g., including gas turbine system and a steam turbine system), combustion gases 26 may discharge from exhaust frame 34, and may flow in the flow direction (D) into a heat recovery steam generator of the combined cycle power plant.

As shown in FIG. 1, and discussed herein in detail, air filtration assembly 100 of gas turbine system 10 may include a plurality of components, devices, and/or systems that may detect when particles are in intake air that may form filtered air 18. Additionally, or alternatively, air filtration assembly 100 may include a plurality of components, devices, and/or systems that may improve filtration of particles and/or prevent particles from being present in filtered air 18, prior to filtered air 18 being delivered to compressor 12. As discussed herein, the detection of particles and/or improved filtration of particles using air filtration assembly 100 may reduce/prevent damage to the internal components of gas turbine system 10 which receive and/or utilize filtered air 18 during operation. Furthermore, the implementation of air filtration assembly 100 may maintain/improve operational efficiencies of gas turbine system 10 by reducing/eliminating the number of undesirable particles included in filtered air 18.

As shown in FIG. 1, air filtration assembly 100 of gas turbine system 10 may include an air inlet duct 102. Air inlet duct 102 may be in fluid communication with compressor 12 of gas turbine system 10 for providing filtered air 18 therein. Air inlet duct 102 may be formed from any suitable duct components and/or duct system that may be configured to receive an intake air 104 and include or house at least one component, device, and/or system therein to filter intake air 104. In the non-limiting example, air inlet duct 102 may include an inlet 106 positioned and/or formed on a first end of air inlet duct 102, an outlet 108 positioned opposite inlet 106 on a second end of air inlet duct 102, and an internal cavity 110 extending between inlet 106 and outlet 108. Inlet 106 may receive intake air 104 including particle(s) 112, and may subsequently pass intake air 104 through internal cavity 110 to outlet 108 to be provided to compressor 12. As discussed herein, intake air 104 including particles 112 may move through internal cavity 110 of air inlet duct 102, and interact and/or be processed by the component(s), device(s), and/or system(s) of air filtration assembly 100 found in internal cavity 110 to filter particles 112 from intake air 104. Filtering particles 112 from intake air 104 may form filtered air 18 utilized as working fluid by compressor 12.

Air filtration assembly 100 may also include a plurality of vane filters 118 that may filter large particles 112 from intake air 104. More specifically, air filtration assembly 100 may include a plurality of vane filters 118 positioned on, at, within, and/or adjacent inlet of inlet 106 of air inlet duct 102. The plurality of vane filters 118 positioned at inlet 106 may provide the first form of filtration of intake air 104 for removing particles 112 included in intake air 104. The plurality of vane filters 118 may be formed as any suitable filtering component that may be configured to remove and/or filter out large particles and/or debris that may be found in intake air 104, such as, sand grains, dirt, rain drops, snow, and other undesirable debris. In non-limiting examples, the plurality of vane filters 118 may include weather hoods and/or a screen(s) formed across inlet 106 of air inlet duct 102.

An array of fabric filters 120 may also be included in air filtration assembly 100. In the non-limiting example shown in FIG. 1, the array of fabric filters 120 may be positioned in air inlet duct 102, and more specifically in internal cavity 110 of air inlet duct 102. Additionally, the array of fabric filters 120 may be positioned in air inlet duct 102 downstream of inlet 106 and the plurality of vane filters 118. The array of fabric filters 120 may be formed as any suitable filtering components and/or devices that may be configured to further filter particles 112 from intake air 104 flowing therethrough. That is, the array of fabric filters 120 may be configured to filter finer and/or smaller particulates included in intake air 104 that may not necessarily be filtered by the plurality of vane filters 118. In the non-limiting example shown, the array of fabric filters 120 may be formed as a plurality of fabric filter bag. In another non-limiting example, fabric filters 120 may be formed from a plurality of conical fabric filters. The array of fabric filters 120 may also be formed as either pulsed fabric filters or static fabric filters.

Air filtration assembly 100 may also include a silencer assembly 122. Silencer assembly 122 may be positioned in air inlet duct 102 and/or in internal cavity 110 of air inlet duct 102. As shown in FIG. 1, silencer assembly 122 may be positioned downstream of the array of fabric filters 120, and adjacent outlet 108 of air inlet duct 102. In the non-limiting example, intake air 104 may pass through silencer assembly 122 to form filtered air 18, which may in turn be provided from silencer assembly 122 and/or outlet 108 of air filtration assembly 100 to compressor 12, as discussed herein. Silencer assembly 122 may be formed as any suitable component, system, and/or assembly of components figured to reduce the "noise" of compressor 12 transmitted through the air inlet 106. For example, silencer assembly 122 may be formed as a plurality of silencer panels that may muffle and/or reduce the noise associated with the operation of gas turbine system 10.

The non-limiting example of air filtration assembly 100 shown in FIG. 1 also includes components, devices, and/or systems that may detect undesirable particles 112 in intake air 104. More specifically, during operation of air filtration assembly 100 undesirable particles 112 included in intake air 104 may not be filtered by the plurality of vane filters 118 and/or the array of fabric filters 120. Particles 112 may not be filtered due to their size (e.g., neither filtered by vane filters 118 nor fabric filters 120), and/or due to faults or deficiencies in the plurality of vane filters 118 and/or the array of fabric filters 120. For example, and as shown in FIG. 1, particles 112 may pass through, not be filtered by, and/or may be flow downstream of the array of fabric filters 120 due to particle size, filter tears, and/or holes formed in some of the fabric filters 120, improper installation of fabric filters 120, and/or per solving and recrystallization processes. The tears and/or holes may be formed in fabric filters 120 by debris (e.g., insects) that may flow past the plurality of vane filters 118, improper installation and/or care of fabric filters 120, manufacturing defects, and/or operational wear of fabric filters 120. As a result, particles 112 included in intake air 104 may not be filtered and/or collected by fabric filters 120 and may flow through the holes. As discussed herein, detecting particles 112 within the air inlet duct(s) beyond the plurality of vane filters 118 and/or the array of fabric filters 120 may indicate that components of air infiltration assembly 100 are not functioning properly and/or may require maintenance (e.g., replacement of torn fabric filters). This in turn, may reduce/prevent damage to compressor 12, combustor 22, and/or turbine 28 by particles 112 during operation, and/or may maintain/improve operational efficiencies of gas turbine system 10 by reducing/eliminating the number of undesirable particles 112 included in filtered air 18.

As shown in FIG. 1, air filtration assembly 100 may include an electrostatic component 124 positioned in air inlet duct 102. More specifically, electrostatic component 124 may be positioned within internal cavity 110 of air inlet duct 102, downstream of the array of fabric filters 120. Additionally as shown, electrostatic component 124 may be positioned upstream of silencer assembly 122 of air filtration assembly 100. Electrostatic component 124 may be configured to charge particles 112 that pass through the plurality of vane filters 118 and/or the array of fabric filters 120, and in turn through and/or over electrostatic component 124. As discussed herein, charged particles 113 included in intake air 104 may allow for easier and/or improved detection of particles 113 before particles 113 reach compressor 12 of gas turbine system 10.

Figure 2:
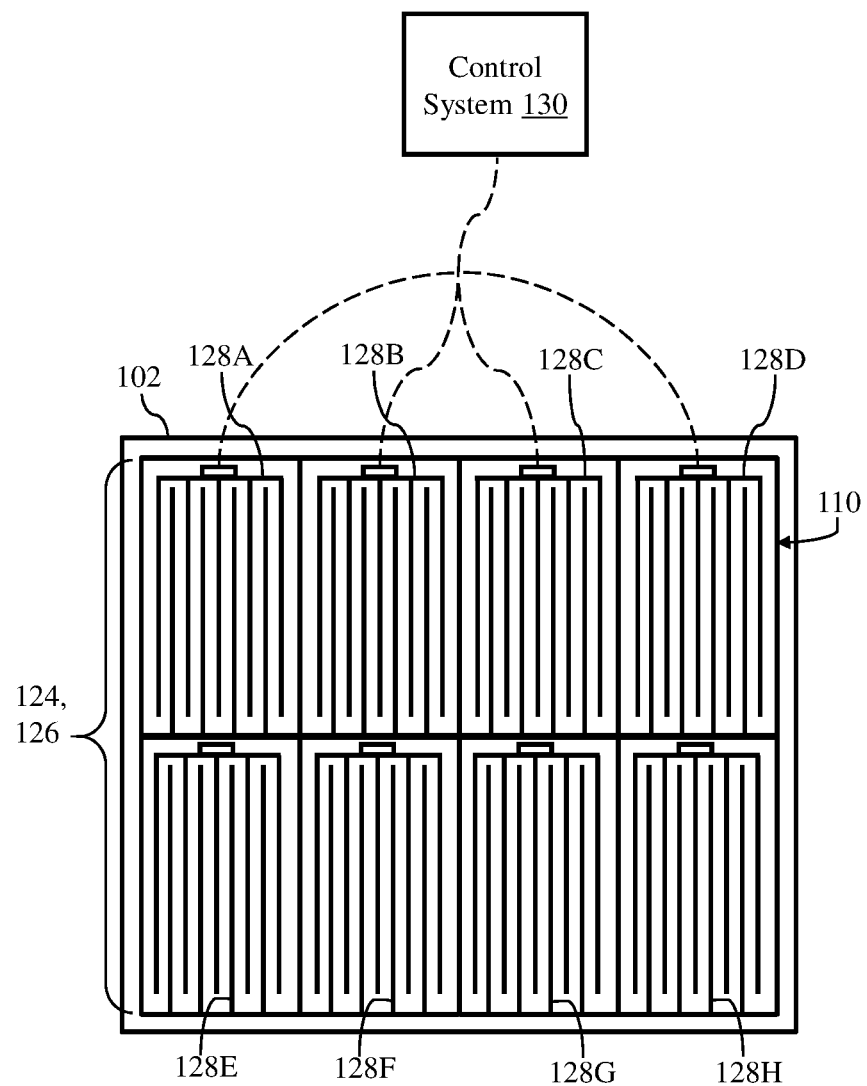
FIG. 2 shows a front cross-sectional view of an air inlet duct of the air infiltration assembly including the matrix of ionizers, according to embodiments of the disclosure.

In the non-limiting example shown in FIG. 1, electrostatic component 124 may be formed and/or configured as a plurality or matrix of ionizers 126 (hereafter, "matrix of ionizers 126"). The matrix of ionizers 126 may be positioned within air inlet duct 102, downstream of the array of fabric filters 120. Turning to FIG. 2, with continued reference to FIG. 1, the matrix of ionizers 126 may span over the entirety of a front cross-sectional area of inlet duct 102. That is, and as shown in FIG. 2, the matrix of ionizers 126 forming electrostatic component 124 may span and/or cover the entirety of an area of internal cavity 110 of inlet duct 102, such that every particle 112 that may pass the array of fabric filters 120 must pass over and/or pass through the matrix of ionizers 126. In the non-limiting example, the matrix of ionizers 126 forming electrostatic component 124 may be formed as a plurality of matrix of corona chargers or corona wires. However, it is understood that ionizers 126 of filtration assembly 100 may be formed from any suitable device, component, and/or system that may be configured to charge intake air particles 112, as discussed herein.

As shown in FIG. 2, the matrix of ionizers 126 may include a plurality of ionizer cells 128A-128H positioned within inlet duct 102, and more specifically in internal cavity 110 of inlet duct 102. In the non-limiting example where ionizers 126 are formed as corona chargers, ionizer cell 128A-128H may include a plurality of wires and/or plates that may be electrically charged and/or configured to provide a flux of electrical charged ions/electrons between respective wires/plates within each ionizer cell 128A-128H. The electrical charge provided and/or generated by each ionizer cell 128A-128H may include a predetermined voltage. Additionally during operation of gas turbine system 10, each of the plurality of ionizer cells 128A-128H may operate at and/or generate a distinct, predetermined voltage from the other ionizer cells 128A-128H forming the matrix of ionizers 126. For example, during a moment in time, a first ionizer cell 128A may operate and/or generate a voltage of five (5) kilovolts (kV), a second ionizer cell 128B may operate and/or generate a voltage of six (6) kilovolts (kV), a third ionizer cell 128C may operate and/or generate a voltage of four (4) kilovolts (kV), and a fourth ionizer cell 128D may not be operational, may be switched "off" and/or may not generate a voltage. As discussed herein, as particles 112 of intake air 104 pass over and/or pass through one of the plurality of ionizer cells 128A-128H, the corresponding ionizer cell 128A-128H may charge particle 112 to form charged particle 113 (see, FIG. 1) charged to different levels (e.g., total load carried) based on the voltages of the ionizer cells and the associated flux of electrons/ions in air inlet duct 102. Additionally, or alternatively, when a high density of particles 112 pass over and/or pass through one of the plurality of ionizer cells 128A-128H, particles 112 may alter the breakthrough or breakdown voltage within the corresponding ionizer cell 128A-128H. In either example, the use of the matrix of ionizers 126 formed as ionizer cells 128A-128H may aid in the detection of undesirable particles 112 flowing downstream of the array of fabric filters 120, and/or may aid in identifying a location in air filtration assembly 100 (e.g., portion of fabric filters 120) that is allowing particles 112 to undesirably flow through the matrix of ionizers 126.

It is understood that the number of ionizer cells 128A-128H forming the matrix of ionizers 126 shown in the embodiments is merely illustrative. That is, in the non-limiting example shown in FIG. 2, eight (8) ionizer cells 128A-128H are shown. The matrix of ionizers 126 of air filtration assembly 100 may include more or less ionizer cells 128 than those shown in the figures. Additionally, the number and/or size of ionizer cells 128 forming the matrix of ionizers 126 is dependent, at least in part on the size, shape, and/or dimension/area of air inlet duct 102 that contains and/or houses the matrix of ionizers 126.

The operation of the matrix of ionizers 126, and more specifically each of the plurality of ionizer cells 128A-128H may be controlled by a control system 130. That is, and as shown in FIGS. 1 and 2, control system 130 may be operably coupled and/or in operative communication with each of the plurality of ionizer cells 128A-128H forming the matrix of ionizers 126. As such, control system 130 of air filtration assembly 100 may control the operation of each of the plurality of ionizer cells 128A-128H forming the matrix of ionizers 126 by switching the ionizer cells 128A-128H between "on" and "off." Additionally, control system 130 may also control the distinct, predetermined voltage generated by each of the plurality of ionizer cells 128A-128H during operation. As shown in FIG. 1, control system 130 may also be in operable communication with a turbine control system 36 configured to control the operation of the power generation devices (e.g., compressor 12, combustion 22, turbine 28, and so on) of gas turbine system 10. As discussed herein, control system 130 may provide information to turbine control system 36 relating to detected, undesirable particles 112 flowing through air filtration assembly 100. Additionally, or alternatively, control system 130 may by-pass turbine control system 36 to shut down the power generation devices of gas turbine system 10 in response to detecting an undesirable amount/concentration of particles 112 within air filtration assembly 100, which may cause damage to compressor 12, combustor 22, and/or turbine 28 if exposed.

In a non-limiting example, control system 130 and turbine control system 36, may be formed or configured as single, stand-alone systems or computing devices that function separately, as discussed herein, and are in communication with one another. Alternatively, control system 130 may be integrally formed within, in communication with and/or formed as a part of turbine control system 36. However embodied, control system 130 and turbine control system 36 may be formed of any suitable device and/or system that may be configured to obtain and process information relating to gas turbine system 10, and control the various components of gas turbine system 10 and air filtration assembly 100.

Air filtration system 100 may also include at least one electrostatic sensor 132. As shown in FIG. 1, electrostatic sensor(s) 132 may be operably coupled to and/or in operable communication with control system 130. Electrostatic sensor(s) 132 may be positioned downstream of the matrix of ionizers 126. Additionally, electrostatic sensor(s) 132 may be positioned upstream of compressor 12. In the non-limiting example, electrostatic sensor(s) 132 may also be positioned downstream of air inlet duct 102 and silencer assembly 122, respectively. In other non-limiting examples (not shown) electrostatic sensor(s) 132 may be positioned upstream of silencer assembly 122 and within air inlet duct 102, respectively, or alternatively electrostatic sensor(s) 132 may be positioned within silencer assembly 122—so long as electrostatic sensor(s) 132 are positioned downstream of the matrix of ionizers 126, but upstream of compressor 12. In the non-limiting example, electrostatic sensor(s) 132 may be in fluid communication and/or positioned within a conduit 134 fluidly coupling air filtration assembly 100 and compressor 12. That is, electrostatic sensor(s) 132 may be in communication with conduit 134 that may deliver filtered air 18 to compressor 12.

Electrostatic sensor(s) 132 may be formed from any suitable sensor and/or device that may be configured to detect the charged particles 112 of intake air 104 that may be previously charged by the matrix of ionizers 126 and flow past electrostatic sensor(s) 132 (e.g., particulate matter sensor). As discussed herein, electrostatic sensor(s) 132 detect the total load carried by the uncharged 112 and charged particles 113, as generated by a specific ionizer cell 128A-128H of the plurality of the ionizer cells forming the matrix of ionizers 126. In non-limiting examples, electrostatic sensor(s) 132 may be formed as button sensors with high local resolution, multiple button system sensors arranged in a ring, circumferential ring sensors, and the like. Additionally, or alternatively, electrostatic sensor(s) 132 may be staged in flow direction to increase the detectability of charged particles 113 dragged by the flow and charged by the matrix of ionizers 126 by correlating the signals of the different stages together with the flow speed known from the turbine control system 36.

It is understood that the number of electrostatic sensor(s) 132 shown in the embodiments is merely illustrative. That is, in the non-limiting example shown in FIG. 1, two electrostatic sensors 132 are shown. Air filtration assembly 100 may include more or less electrostatic sensor(s) 132 than those shown in the figures.

During operation of gas turbine system 10, intake air 104 may flow through air filtration assembly 100 to provide working fluid (e.g., filtered air 18) to compressor 12. Particles 112 included in intake air 104 may undesirably flow through filtering components (e.g., plurality of vane filters 118, the array of fabric filters 120) due to damage and/or defect in the same components. In air filtration assembly 100, particles 112 that are not filtered by the plurality of vane filters 118, and/or the array of fabric filters 120 may pass through the matrix of ionizers 126 forming electrostatic component 124. The matrix of ionizers 126 in turn may charge particles 112. More specifically, each of the plurality of ionizer cells 128 forming the matrix of ionizers 126 may electrically charge each particle 112 that flows therethrough, based on a distinct, predetermined voltage of each of the plurality of ionizer cells 128, as controlled by control system 130. Furthermore, when particle(s) 112 pass over and/or pass through one of the plurality of ionizer cells 128A-128H, particles 112 may alter the breakthrough or breakdown voltage within the corresponding ionizer cell 128A-128H, which may also be detectable by control system 130.

As charged particles 113 flow out of air filtration assembly 100 and are delivered to compressor 12 via conduit 134, charged particles 113 may be detected by electrostatic sensor (s) 132. Electrostatic sensor(s) 132 may detect charge particles 113 and may provide information to control system 130 relating to charged particles 112, including, but not limiting to, the amount/concentration of charged particles 113, and/or the associated or corresponding carried load for each detected, charged particle 113. Using this information generated by electrostatic sensor(s) 132, control system 130 may determine if the amount of uncharged particles 112 and charged particles 113 included in filtered air 18 being provided to compressor 12 may damage compressor 12 and/or reduce the operational efficiency of gas turbine system 10. In the non-limiting example where, for instance, the concentration and/or amount of charged particles 113 could or will damage compressor 12, combustor 22, and/or turbine 28, control system 130 may suggest or signal to turbine control system 36 that gas turbine system 10 should be shut down to prevent damage. Additionally, and based on the detected load for each charged particle 113, as well as the altered breakthrough or breakdown voltage within the corresponding ionizer cell 128A-128H, control system 130 may easily identify which filtering component and which location or area may have a defect and/or damage. For example, and with reference to FIG. 2, where a breakthrough voltage is altered in first ionizer cell 128A, and/or charged particles 113 are detected with a first carried load, the predetermined load associated with the voltage of first ionizer cell 128A, control system 130 may determine that the portion and/or area of the array of fabric filters 120 that is aligned upstream with first ionizer cell 128A may require repair/replacement. The inclusion of air filtration assembly 100 with gas turbine system 10 allows for early detection of undesirable particles 112 flowing to compressor 12, which in turn may prevent or reduce damage to compressor 12 by allowing for immediate indication for repair, maintenance, and/or replacement of components of air filtration assembly 100.

Figure 3:
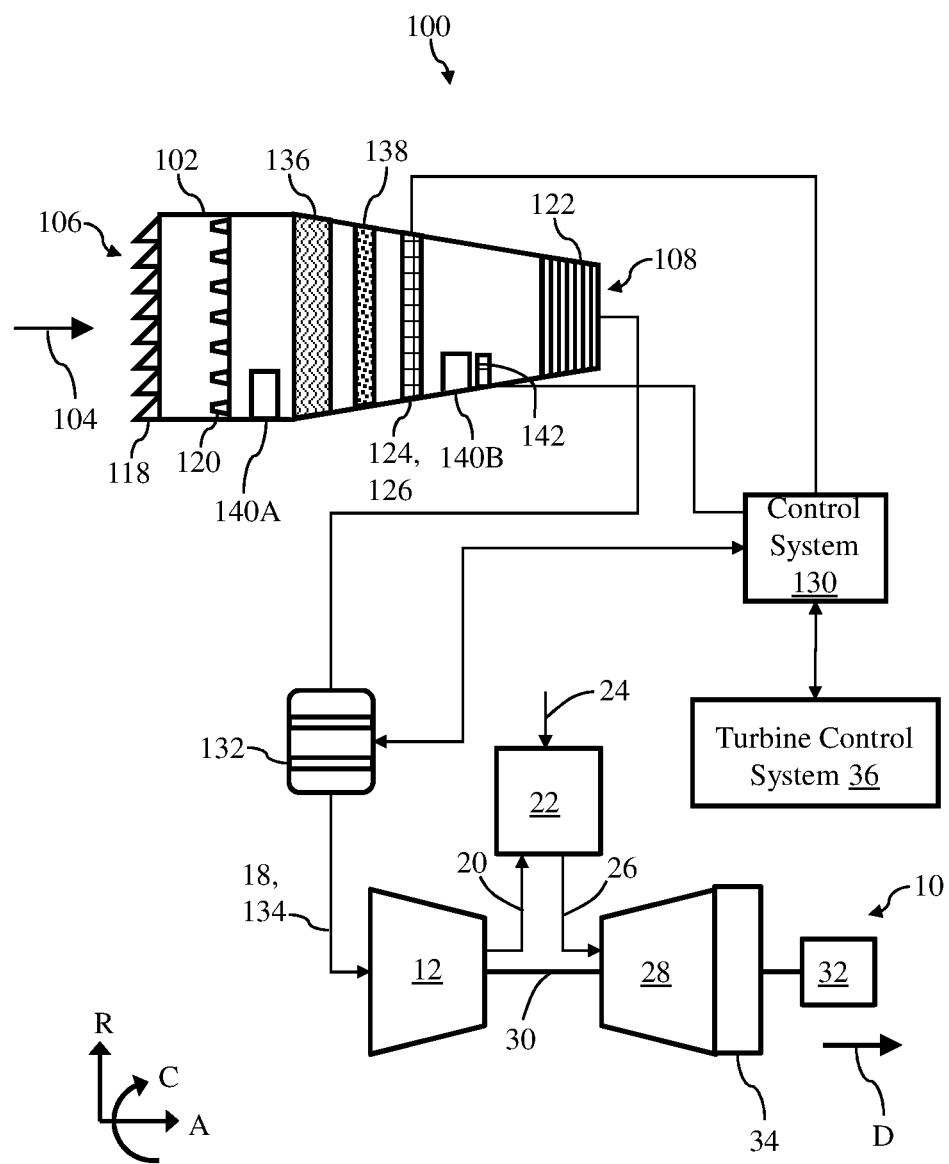
FIG. 3 shows a schematic view of a gas turbine system and an air infiltration assembly including a matrix of ionizers, according to additional embodiments of the disclosure.
Figure 4:
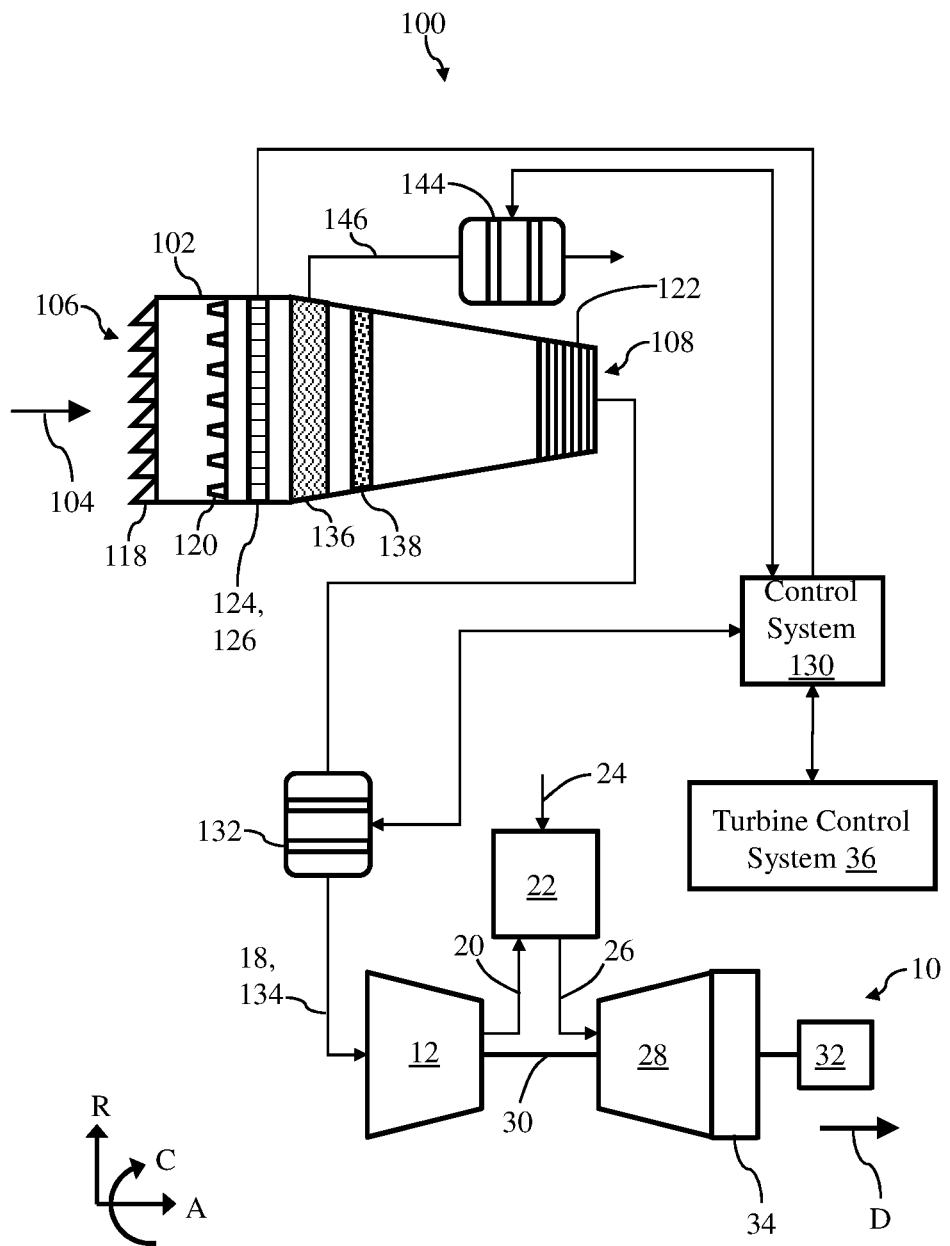
FIG. 4 shows a schematic view of a gas turbine system and an air infiltration assembly including a matrix of ionizers, according to further embodiments of the disclosure.

FIGS. 3 and 4 show schematic views of additional non-limiting examples of gas turbine system 10 including air filtration assembly 100. Air filtration assembly 100 shown in each of the non-limiting examples of FIGS. 3 and 4 may include distinct configurations and/or additional features discussed herein. It is understood that similarly numbered and/or named components may function in a substantially similar fashion. Redundant explanation of these components has been omitted for clarity.

As shown in FIG. 3, air filtration assembly 100 may also include an evaporator 136 and a droplet remover 138. Evaporator 136 and droplet remover 138 may be positioned within air inlet duct 102, and more specifically, in internal cavity 110 of air inlet duct 102, downstream of the array of fabric filters 120, and upstream of silencer assembly 122. Additionally, and as shown in FIG. 3, droplet remover 138 may be positioned downstream of and directly adjacent evaporator 136. Evaporator 136 may be configured as any suitable device and/or system that may be configured to evaporate and/or increase moisture of intake air 104. In non-limiting examples, evaporator 136 may be formed as a wetted fabric or a droplet spray system, configured to also remove unwanted particles 112 from intake air 104. Droplet remover(s) 138, sometimes referred to as demisters, may be formed as any suitable device and/or system that may be configured to remove and/or catch liquid droplets/mist that may be residual within intake air 104 after intake air 104 passes through evaporator 136.

In the non-limiting example shown in FIG. 3, electrostatic component 124, formed as a matrix of ionizers 126, may be positioned in air inlet duct 102, downstream of evaporator 136 and droplet remover 138, respectively. As such, fine water droplets and/or particles 112 flowing through air inlet duct 102 or residual solid particles 112 generated from former, dried water droplets may be charged by matrix of ionizers 126 as similarly discussed herein with respect to FIGS. 1 and 2 only after particles/water droplets 112 pass and/or flow downstream of evaporator 136 and droplet remover 138. Furthermore, the matrix of ionizers 126 positioned downstream of evaporator 136 and droplet remover 138 may be configured to charge water droplets that may pass through and/or become dislodged from droplet remover 138. Similar to particles 112, it may be undesirable for water droplets dislodged from droplet remover 138 to reach compressor 12. As such, detection of the water droplets using electrostatic component 124 (e.g., matrix of ionizers 126) may be desirable to prevent damage and/or a reduction in operational efficiency for gas turbine system 10. Water droplets may be detected using electrostatic sensor(s) 132 by detecting the carried load of the water droplets and/or based on the altered breakthrough or breakdown voltage, as similarly discussed herein. Furthermore, and similar to particles 112, spills in evaporator 136 caused by overload within evaporator 136 may also be detected based on altered breakthrough or breakdown voltage detected within ionizer cell 128A-128H.

Additionally in the non-limiting example, air inlet duct 102 of air filtration system 100 may include at least one access door 140. Access door 140 may be formed in and/or through inlet duct 102 to provide easier access to internal cavity 110, and the components of air filtration assembly 100 included therein. For example, first access door 140A formed in inlet duct 102 downstream of the array of fabric filters 120 and upstream of evaporator 136 may allow for easier access to the array of fabric filters 120 and evaporator 136 for inspection, repair, maintenance, and/or replacement as discussed herein. Additionally, second access door 140B may be formed in air inlet duct 102 downstream of the matrix of ionizers 126 to allow for easier access to the matrix of ionizers 126 and/or the plurality of ionizer cells 128 forming the matrix of ionizers 126. It is understood that the number of access doors 140 shown in the embodiments is merely illustrative. That is, in the non-limiting example shown in FIG. 3, two access doors 140 are shown. Air filtration assembly 100 may include more or less access doors 140 than those shown in the figures.

In order to ensure access door 140 is not providing leaked air into internal cavity 110 including undesirable particles, similar to particles 112 included in intake air 104, air filtration assembly 100 may also include at least one auxiliary ionizer 142. For example, when access door 140 is not properly sealed after opening access door 140 to access or inspect components included within internal cavity 110, air including undesirable particles may leak into internal cavity 110 via gaps or spaces formed in unsealed access door 140. For access doors 140 (e.g., second access door 140B) positioned downstream of the matrix of ionizers 126, any particles included in the leaked air may not pass through the matrix of ionizers 126, and therefore will not be charged by the same. In the non-limiting example, auxiliary ionizer(s) 142, distinct from the matrix of ionizer 126, may be positioned within internal cavity of inlet duct 102 adjacent to and/or downstream of access door 140B. Similar to each ionizer cell 128A-128H of the matrix of ionizers 126 discussed herein with respect to FIG. 1, auxiliary ionizer 142 may generate and/or provide a distinct, predetermined voltage to particles included in the leaked air that may enter internal cavity 110 via access door 140. In the non-limiting example, auxiliary ionizer 142 may provide a voltage that may be distinct from all other voltages generated by the matrix of ionizer 126. As such, and as similarly discussed herein, electrostatic sensor(s) 132 may identify and/or detect particles of leaked air from access door 140 that are charged using auxiliary ionizer 142 based on the detected total load carried by the air. Additionally, or alternatively, control system 130 may be configured to detect particles in leaked air entering internal cavity 110 via access door 140 based on altered breakthrough or breakdown voltage within auxiliary ionizer 142, as similarly discussed herein with respect to ionizer cells 128A-128H.

In the non-limiting example shown in FIG. 4, electrostatic component 124, formed as matrix of ionizers 126, may be positioned in air inlet duct 102, upstream of evaporator 136 and droplet remover 138, respectively. Additionally, matrix of ionizers 126 may be positioned downstream of the array of fabric filters 120 and positioned within internal cavity 110 of inlet duct 102 between the array of fabric filters 120 and evaporator 136. As such, particles 112 flowing through air inlet duct 102 may be charged by matrix of ionizers 126 after particles 112 undesirably flow past the array of fabric filters 120, but prior to particles 112 passing and/or flowing downstream of evaporator 136 and droplet remover 138 to make use of the improved filter efficiency of charged particles passing carefully configured evaporator 136.

Additionally in the non-limiting example shown in FIG. 4, air filtration assembly 100 may also include at least one auxiliary electrostatic sensor(s) 144 in communication with a drain line 146 of evaporator 136. That is, evaporator 136 may include a drain line 146 for removing and/or draining liquid (e.g., deionized water) that may be used for the evaporation process performed on intake air 104. The inclusion of drain line 146 may prevent spills and/or overloading of evaporator 136 as discussed herein with respect to FIG. 3. The liquid included within drain line 146 of evaporator 136 may include particles 113 charged by the matrix of ionizers 126, as discussed herein.

Similar to electrostatic sensor(s) 132 discussed herein, auxiliary electrostatic sensor(s) 144 may be operably coupled to and/or in operable communication with control system 130, and may be in fluid communication and/or positioned within drain line 146 for evaporator 136. Auxiliary electrostatic sensor(s) 144 may be in communication within drain line 146 to analyze the liquid removed from evaporator 136 via drain line 146. More specifically, and where matrix of ionizers 126 are positioned upstream of evaporator 136, auxiliary electrostatic sensor(s) 144 may detect the charge imparted on charged particles 113 included in the liquid that may be previously charged by ionizer cells 128A-128H forming the matrix of ionizers 126 and collected in drain line 146. Auxiliary electrostatic sensor(s) 144 may provide additional information (e.g., optical particle detection) to control system 130 to more accurately determine the amount/concentration of particles 112 that are not being filtered by the plurality of vane filters 118 and/or the array of fabric filters 120, as discussed herein.

FIGS. 5-12 show schematic views of additional non-limiting examples of gas turbine system 10 including air filtration assembly 100. Air filtration assembly 100 shown in each of the non-limiting examples of FIGS. 5-12 may include distinct configurations and/or additional features discussed herein for improved filtration of particles 112 from intake air 104. It is understood that similarly numbered and/or named components may function in a substantially similar fashion. Redundant explanation of these components has been omitted for clarity.

Figure 5:
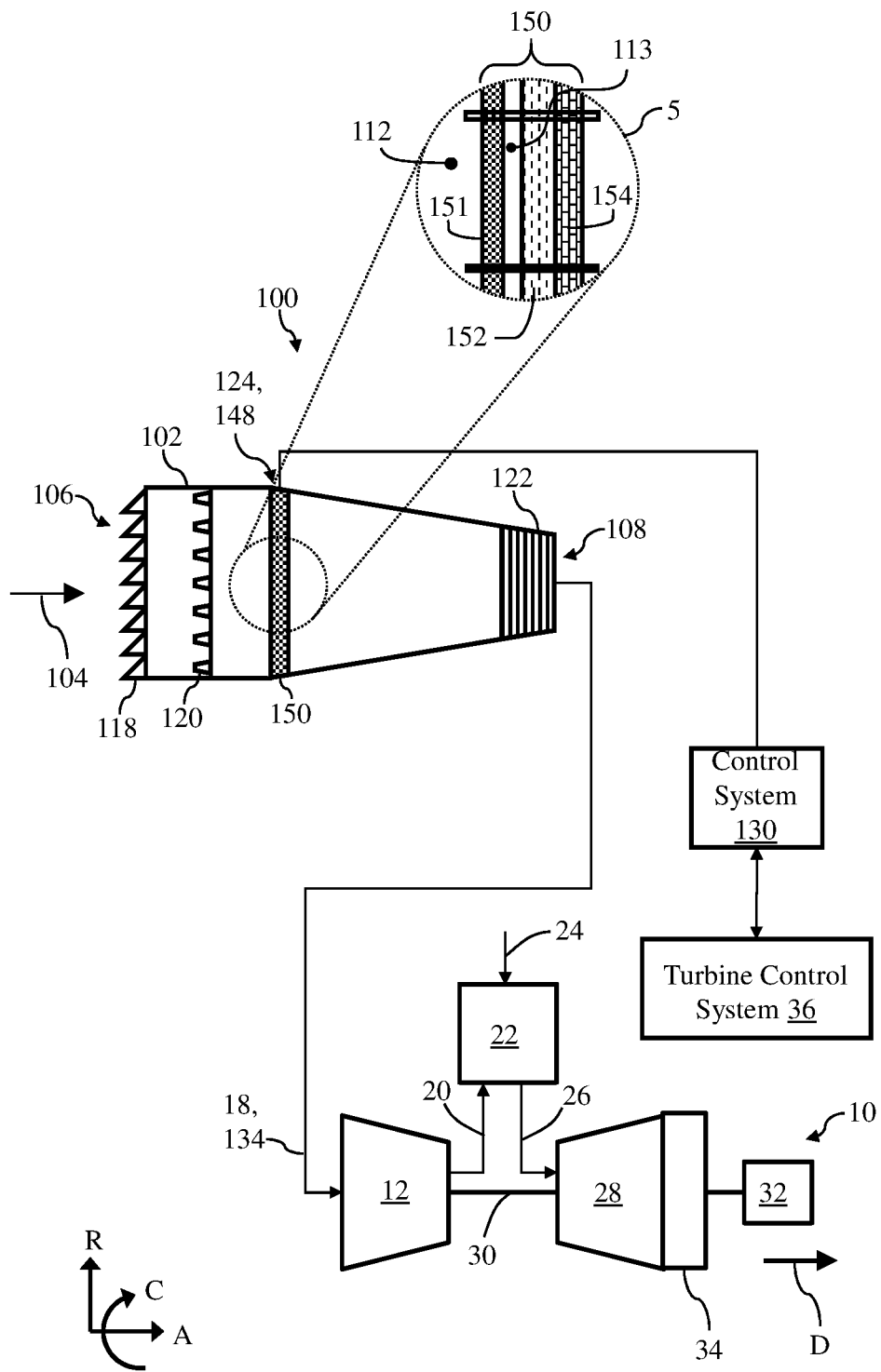
FIG. 5 shows a schematic view of a gas turbine system and an air infiltration assembly including a matrix of electrostatic filters, according to embodiments of the disclosure.

Turning to FIG. 5, and similarly discussed herein with respect to FIGS. 1-4, air filtration assembly 100 may include an electrostatic component 124 positioned within internal cavity 110 of air inlet duct 102, downstream of the array of fabric filters 120. Additionally as shown, electrostatic component 124 may be positioned upstream of silencer assembly 122 of air filtration assembly 100. Electrostatic component 124 may be configured to both charge and filter particles 112 (see, FIG. 1) that pass through the plurality of vane filters 118 and/or the array of fabric filters 120, and in turn through and/or over electrostatic component 124.

Figure 6:
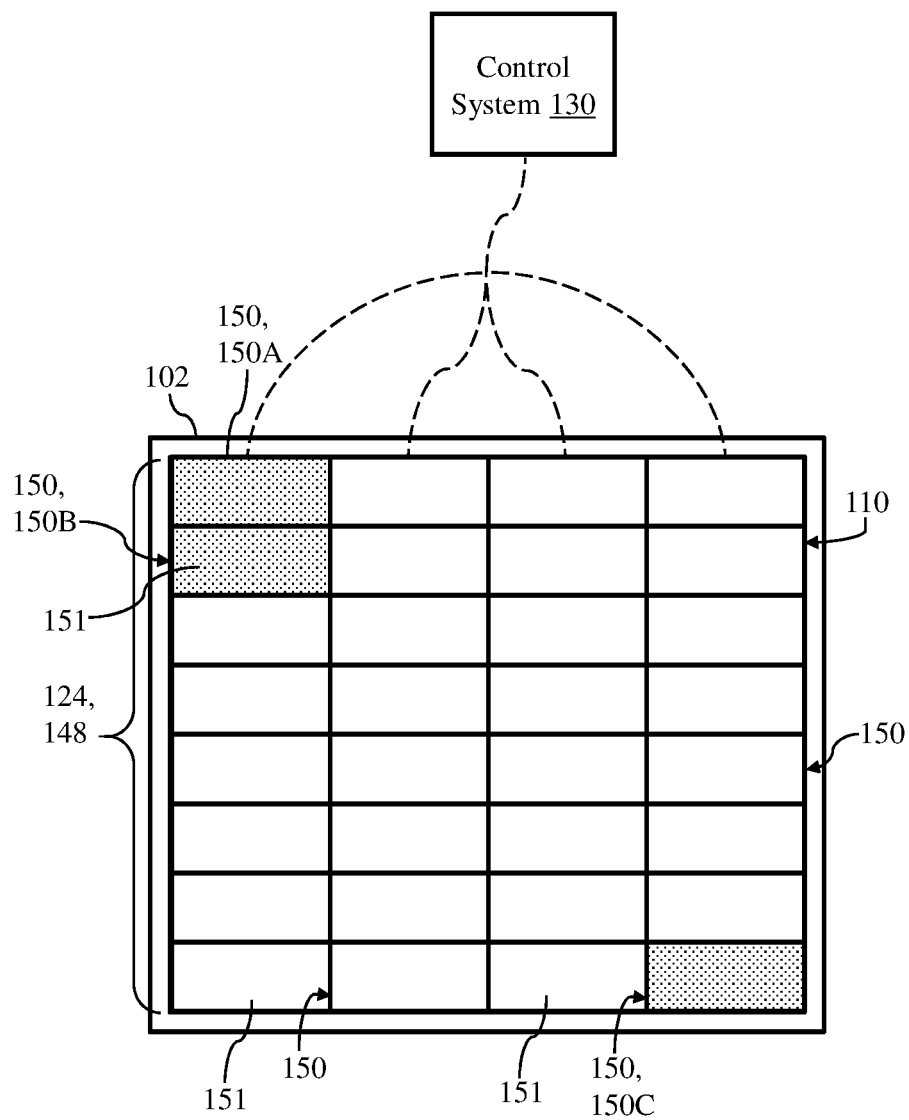
FIG. 6 shows a front cross-sectional view of an air inlet duct of the air infiltration assembly including the matrix of electrostatic filters, according to embodiments of the disclosure.

In the non-limiting example shown in FIG. 5, and distinct from the examples discussed herein with respect to FIGS. 1-4, electrostatic component 124 may be formed and/or configured as a matrix of electrostatic filters 148. The matrix of electrostatic filters 148 may be positioned within air inlet duct 102, and more specifically within internal cavity 110 of inlet duct 102, downstream of the array of fabric filters 120. Turning to FIG. 6, with continued reference to FIG. 5, the matrix of electrostatic filters 148 may span over the entirety of a front cross-sectional area of inlet duct 102. That is, and as shown in FIG. 6, the matrix of electrostatic filters 148 forming electrostatic component 124 may span and/or cover the entirety of an area of internal cavity 110 of inlet duct 102, such that every particle 112 that may pass the array of fabric filters 120 must pass over and/or pass through the matrix of electrostatic filters 148.

As shown in FIG. 6, the matrix of electrostatic filters 148 may include a plurality of electrostatic filter cells 150 positioned within inlet duct 102, and more specifically in internal cavity 110 of inlet duct 102. Each electrostatic filter cell 150 may include a plurality of filter components (e.g., screens) that are operated with voltages independent of all other electrostatic filter cells 150. Returning to briefly to FIG. 5, in a non-limiting example shown in the enlarged insert "5" of FIG. 5, each electrostatic filter cell 150 may include an ionizing device or ionizer 151 (hereafter, "ionizer 151") to charge to the particles flowing through inlet duct 102 and at least one collector plate 152 to precipitate the charged particles. As shown in insert 5, ionizer 151 and collector plate(s) 152 of each electrostatic filter cell 150 may be formed and/or positioned within air inlet duct 102, and more specifically within internal cavity 110, downstream of the array of fabric filters 120. Additionally in the non-limiting example, collector plate(s) 152 may also be positioned adjacent to and downstream of the ionizers 151 of electrostatic filter cell 150. Ionizer 151 may be substantially similar to the matrix of ionizers 126 discussed herein with respect to FIGS. 1-4, and may be formed as, for example corona charger cells and/or corona wires. Additionally, Collector plate(s) 152 may be formed as any suitable device and/or assembly that may be configured to filter and/or remove particles 112 from intake air 104, subsequent to particles 112 flowing through and/or past ionizer 151 of electrostatic filter cells 150. In a non-limiting example, collector plates(s) 152 may be formed as a plurality of plates supplied with different voltages. In the non-limiting example, collector plate(s) 152 may continuously provide a voltage to and/or may attract/filter particles 112 from intake air 104 flowing through air inlet duct 102, charged by the ionizer, as discussed herein.

The electrical charge provided and/or generated by each electrostatic filter cell 150, and more specifically ionizer 151 and collector plate 152, respectively, may be controlled by applied voltage, when operational. Additionally during operation of gas turbine system 10, the voltage for each of the plurality of electrostatic filter cells 150/ionizers 151 may be altered and/or adjusted by control system 130 to adjust the charge of particles 112 and the filtering efficiency of the collector plates 154. For example, a first electrostatic filter cell 150A and second electrostatic filter cell 150B may be "on," operable, active, and/or may generate a voltage of five (5) kilovolts (kV) on ionizer 151 and a voltage of two (2) kilovolts (kV) on collector plates 152, while a third electrostatic filter cell 150C may operate and/or generate a voltage of four (4) kilovolts (kV) on ionizer 151 and a voltage of seven (7) kilovolts (kV) on collector plates 152. The remaining electrostatic filter cells 150 forming the matrix of electrostatic filters 148 may be "off," inactive, and/or may not be generating a voltage until the local breakdown voltage of the ionizer 151 and/or the collector plates 152. As discussed herein, turning on electrostatic filter cells 150 of the matrix of electrostatic filters 148 to provide a charge to particles 112 may aid in the filtration and/or removal of particles 112 within air filtration assembly 100.

It is understood that the number and cross section of electrostatic filter cells 150 forming the matrix of electrostatic filters 148 shown in the embodiments is merely illustrative. That is, in the non-limiting example shown in FIG. 6, thirty-two, rectangular, electrostatic filter cells 150 are shown. The matrix of electrostatic filters 148 of air filtration assembly 100 may include more or less electrostatic filter cells 150, having different shapes of cross sections, than those shown in the figures. Additionally, the number and/or size of electrostatic filter cells 150 forming the matrix of electrostatic filters 148 is dependent, at least in part on the size, shape, and/or dimension/area of air inlet duct 102 that contains and/or houses the matrix of electrostatic filters 148.

The electrostatic filter cell 150 may also include a measurement device 154. In the non-limiting example shown in insert 5 of FIG. 5, measurement device 154 may be integrated to the plurality of electrostatic filter cells 150, and more specifically may be positioned on and/or in communication with collector plate(s) 152 of electrostatic filter cells 150. In other non-limiting examples (see, FIG. 7), measurement device 154 may be positioned downstream of the ionizers 151 of electrostatic filter cells 150. Measurement device 154 may be formed as any suitable device, component, and/or assembly that may be configured to identify and/or detect the amount, concentration, and/or position of particles 112 of intake air 104 that may undesirably flow through and/or past the array of fabric filters 120. In a non-limiting example, measurement device 154 may be formed as a plurality of sensors (e.g., optical sensors) that may detect particles 112 flowing through internal cavity 110 of air inlet duct 102. In another non-limiting example, measurement device 154 may include a plurality of ionizers or wires that may detect the amount, concentration, and/or position of particles 112 of intake air 104 by identifying voltage breakthroughs or breakdowns within the ionizers, as similarly discussed herein with respect to ionizer cell 128A-128H of FIGS. 1-4. As discussed herein, utilizing measurement device 154 to detect the amount, concentration, and/or position of particles 112 of intake air 104 may allow for control system 130 to more accurately engage (e.g., "turn on") specific electrostatic filter cells 150 to aid in the filtration of particles 112.

Additionally during operation of gas turbine system 10, the activation of select electrostatic filter cells 150 by control system 130 may further aid in the filtration and/or removal of particles 112 by collector plate(s) 152. That is, after particles 112 flow downstream of the array of fabric filters 120, measurement device 154 may detect particles 112. More specifically, measurement device 154 may detect an amount, concentration, and position of particles 112 flowing through air inlet duct 102. Using the information relating to particles 112 detected by measurement device 154, control system 130 may identify at least one electrostatic filter cell 150 of the matrix of electrostatic filters 148 that may be aligned with and/or may receive detected particles 112.

Control system 130 may than determine if the detected amount and/or concentration of particles 112 exceeds a predetermined threshold of particles. The predetermined threshold of particles may be based on a predetermined or predefined maximum of particles that may be found within intake air 104 before damage to compressor 12 will occur and/or a decrease in operational efficiency of gas turbine system 10 is eminent. In response to the amount/concentration of detect particles 112 exceeding the predetermined threshold, control system 130 may adjust the operational parameters of the identified electrostatic filter cell(s) 150 that may receive the particles 112. In a non-limiting example, adjusting the operational parameters may include control system 130 engaging and/or switching the identified electrostatic filter cell(s) 150, and more specifically the voltage supplied to the ionizers 151 and/or collector plate(s) 152, from "off" (e.g., non-operational) to "on" (e.g., operational). In another non-limiting example, control system 130 may adjust the operational parameters of the identified electrostatic filter cell(s) 150 by increasing or decreasing the charge and/or voltage generated by the electrostatic filter cell(s) 150, and the components included therein (e.g., ionizer). Once the operational parameters of identified electrostatic filter cell(s) 150 have been adjusted, particles 112 passing therethrough may be charged and subsequently flowed to and filtered by collector plate(s) 152 included in each electrostatic filter cell 150 of the matrix of electrostatic filters 148.

FIGS. 7-11 show schematic views of additional non-limiting examples of gas turbine system 10 and air filtration assembly 100 including the matrix of electrostatic filters 148. It is understood that similarly numbered and/or named components may function in a substantially similar fashion. Redundant explanation of these components has been omitted for clarity.

Figure 7:
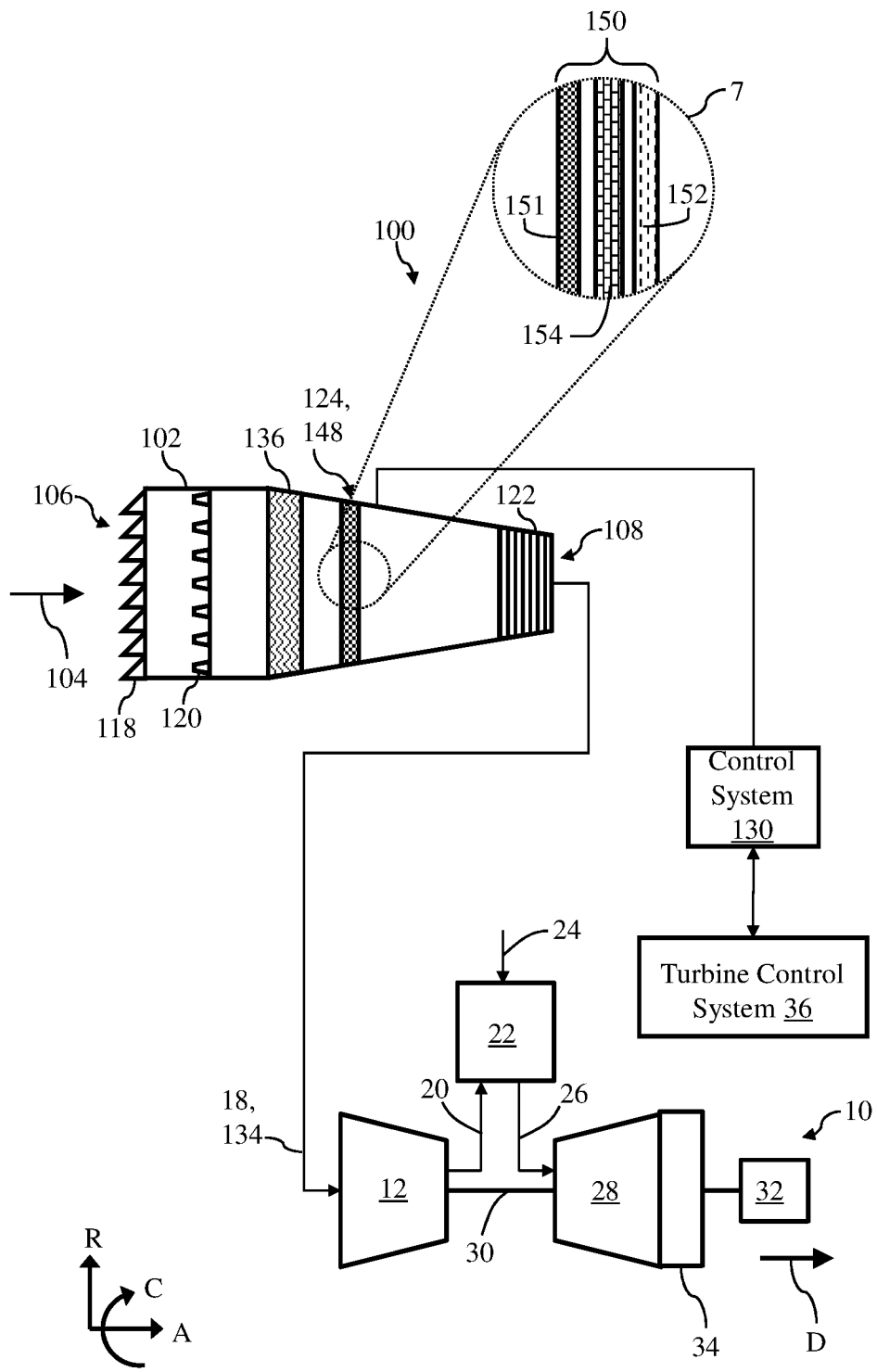
FIGS. 7-11 show various schematic views of a gas turbine system and an air infiltration assembly including a matrix of electrostatic filters, according to various embodiments of the disclosure.

As shown in FIG. 7, air filtration assembly 100 may include evaporator 136 positioned within air inlet duct 102. More specifically, evaporator 136 may be positioned within internal cavity 110 of air inlet duct 102, downstream of the array of fabric filters 120. In the non-limiting example, air filtration assembly 100 may not include droplet remover 138 (see, FIG. 3). Rather, air filtration assembly 100 may only include the matrix of electrostatic filters 148 positioned within air inlet duct 102, downstream of evaporator 136. Specifically, the plurality of electrostatic filter cells 150 including ionizer 151, collector plate(s) 152, and measurement device 154 may all be positioned downstream of evaporator. As such, all particles 112 may flow through and/or past evaporator 136 prior to flowing through the matrix of electrostatic filters 148.

Additionally as shown in the insert 7 of the non-limiting of FIG. 7, measurement device 154 may be positioned downstream of the ionizers 151 for electrostatic filter cells 150, and upstream of collector plate(s) 152. As such, measurement device 154 may detect particles 112 and water droplets emitted by the evaporator after particles 112 of intake air 104 and the water droplets pass through and/or over the ionizers 151 for each of the plurality of electrostatic filter cells 150 but before being filtered/precipitated by collector plate(s) 152. In another non-limiting example, the collector plate(s) 152 will be equipped with a water draining system to cope with water droplet precipitation rates leading to a water film flowing down the precipitator plate.

Figure 8:
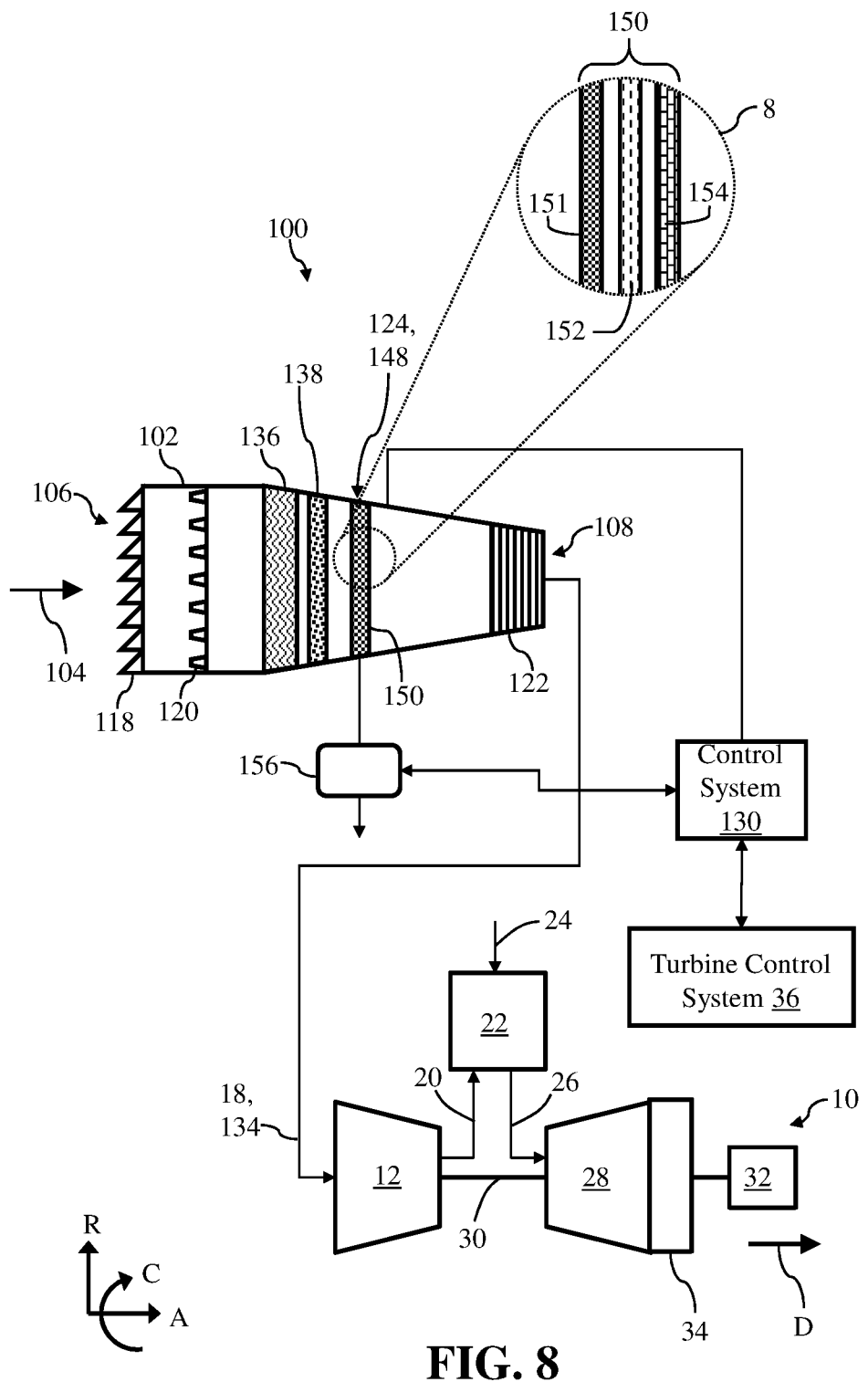

In the non-limiting example shown in FIG. 8, air filtration assembly 100 may include evaporator 136 and droplet remover 138 positioned within air inlet duct 102. Evaporator 136 and droplet remover 138 may be positioned within internal cavity 110 of air inlet duct 102, downstream of the array of fabric filters 120. Additionally, droplet remover 138 may be positioned downstream of evaporator 136, and upstream of the matrix of electrostatic filters 148. In the non-limiting example, all particles 112 may flow through and/or past evaporator 136 and droplet remover 138 prior to flowing together with emitted water droplets through the matrix of electrostatic filters 148.

Additionally as shown in the in the insert 8 of non-limiting of FIG. 8, measurement device 154 may be positioned downstream of ionizer 151, and collector plate(s) 152, respectively. That is, both the ionizer 151 and collector plate(s) 152 of the electrostatic filter cell 150 may be positioned within air inlet duct 102 upstream of measurement device 154 of the electrostatic filter cell 150. As such, measurement device 154 may detect particles 112 after particles 112 of intake air 104 pass through and/or over ionizer 151 as well as collector plate(s) 152.

Figure 9:
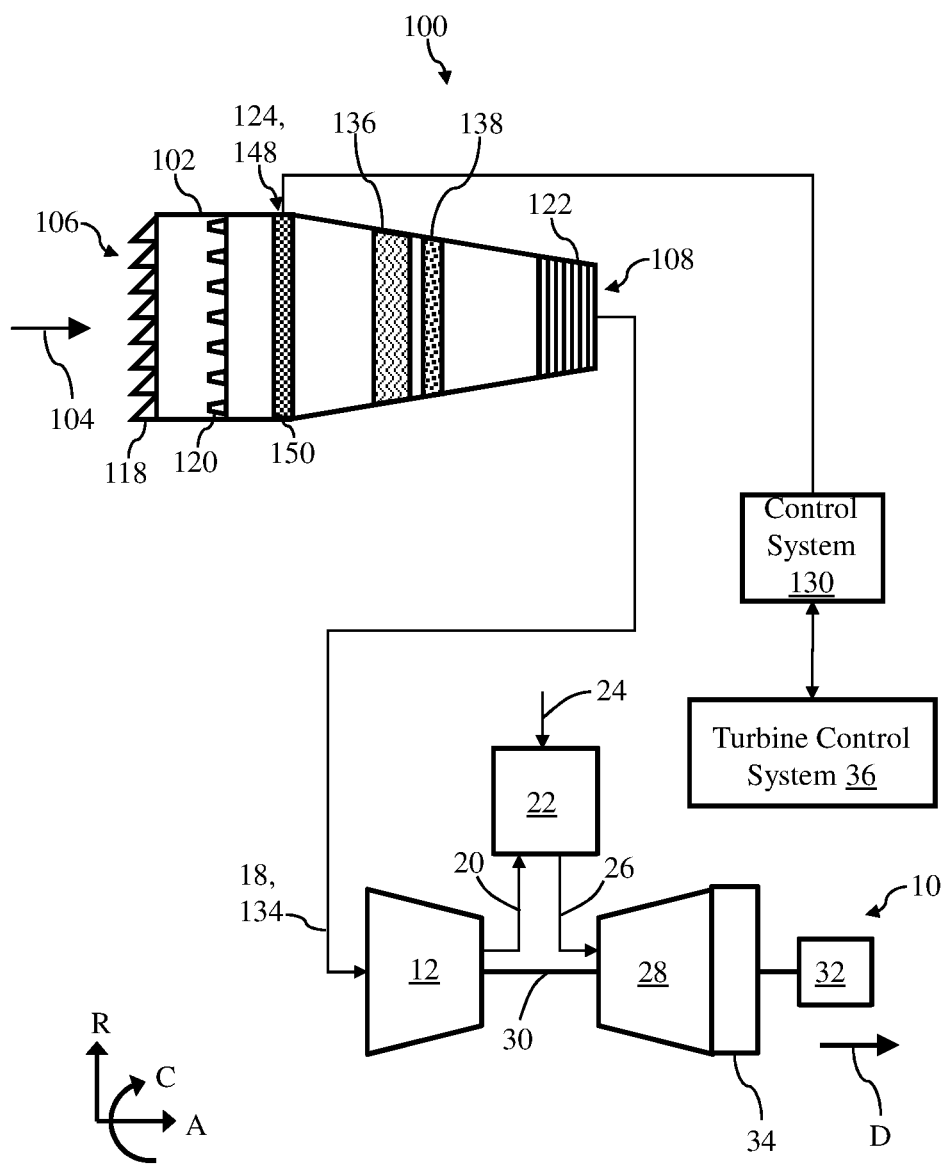

Air filtration assembly 100 shown in FIG. 8 may also include a drain detection system 156. Drain detection system 156 may be in communication with the matrix of electrostatic filters 148 for collecting liquid (e.g., water) generated and/or collected during the filtration process performed by the matrix of electrostatic filters 148. In the non-limiting example, drain detection system 156 may be in communication with collector plate(s) 152 of the matrix of electrostatic filters 148 for collecting the liquid. Additionally, drain detection system 156 may also be operably coupled to and/or in operative communication with control system 130. In the non-limiting example, drain detection system 156 may include various devices and/or components (e.g., sensors) for analyzing the liquid received therein at a central position as indicated in FIG. 9, however also as integral part of the electrostatic cell 150. Specifically, drain detection system 156 may analyze the liquid received by the matrix of electrostatic filters 148 to obtain data relating to the liquid and/or charged particles 112 included in the liquid. For example, drain detection system 156 may detect and/or determine the size and/or amount of particles 112 included in the liquid, the composition (e.g., solved salts) of particles 112 including within the liquid, and/or the charge deposited by the particles 112 into the liquid. The information obtained and/or detected by drain detection system 156 may be provided to control system 130, which in turn may utilize the information to adjust the operational characteristics of electrostatic filter cells 150, as similarly discussed herein with respect to FIGS. 5 and 6.

Figure 10:
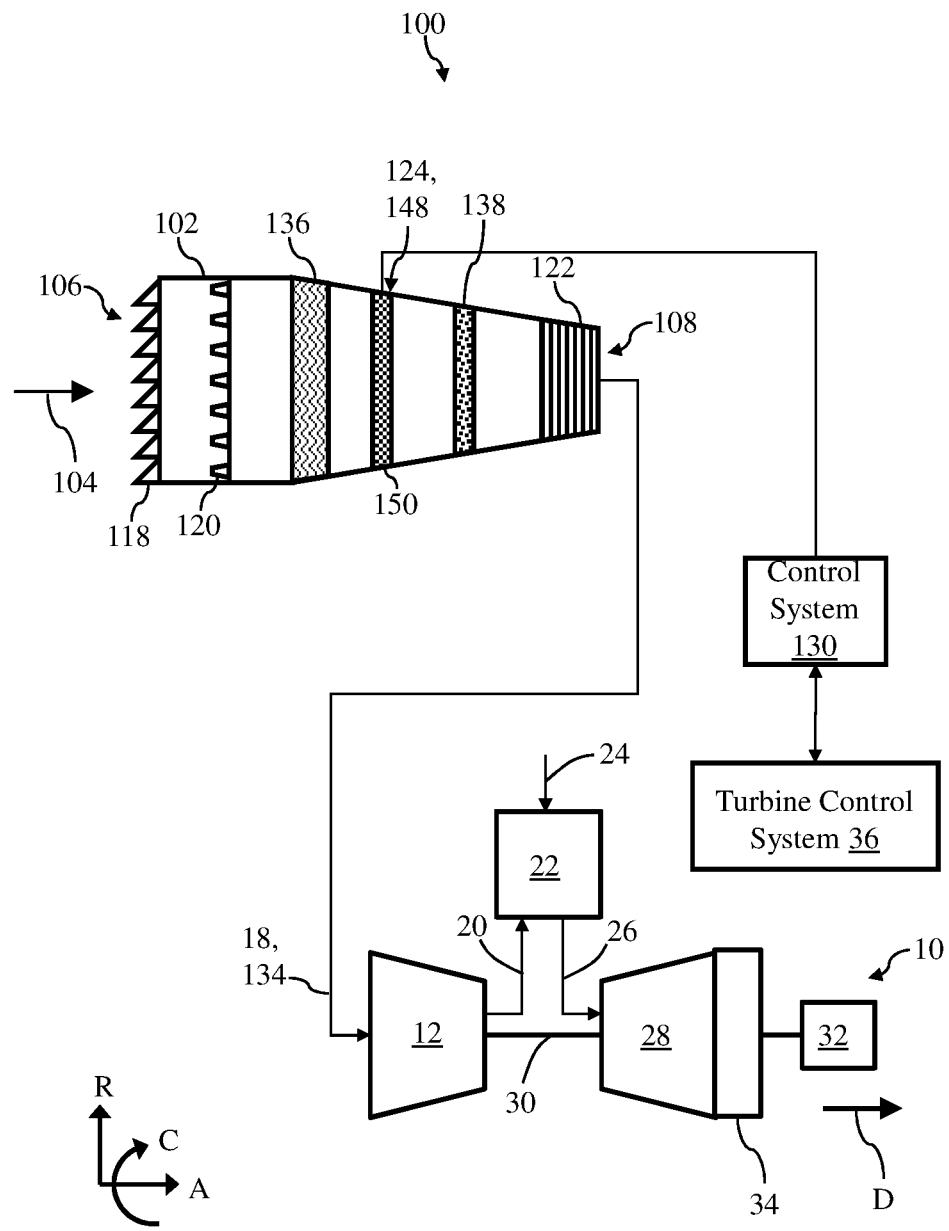
Figure 11:
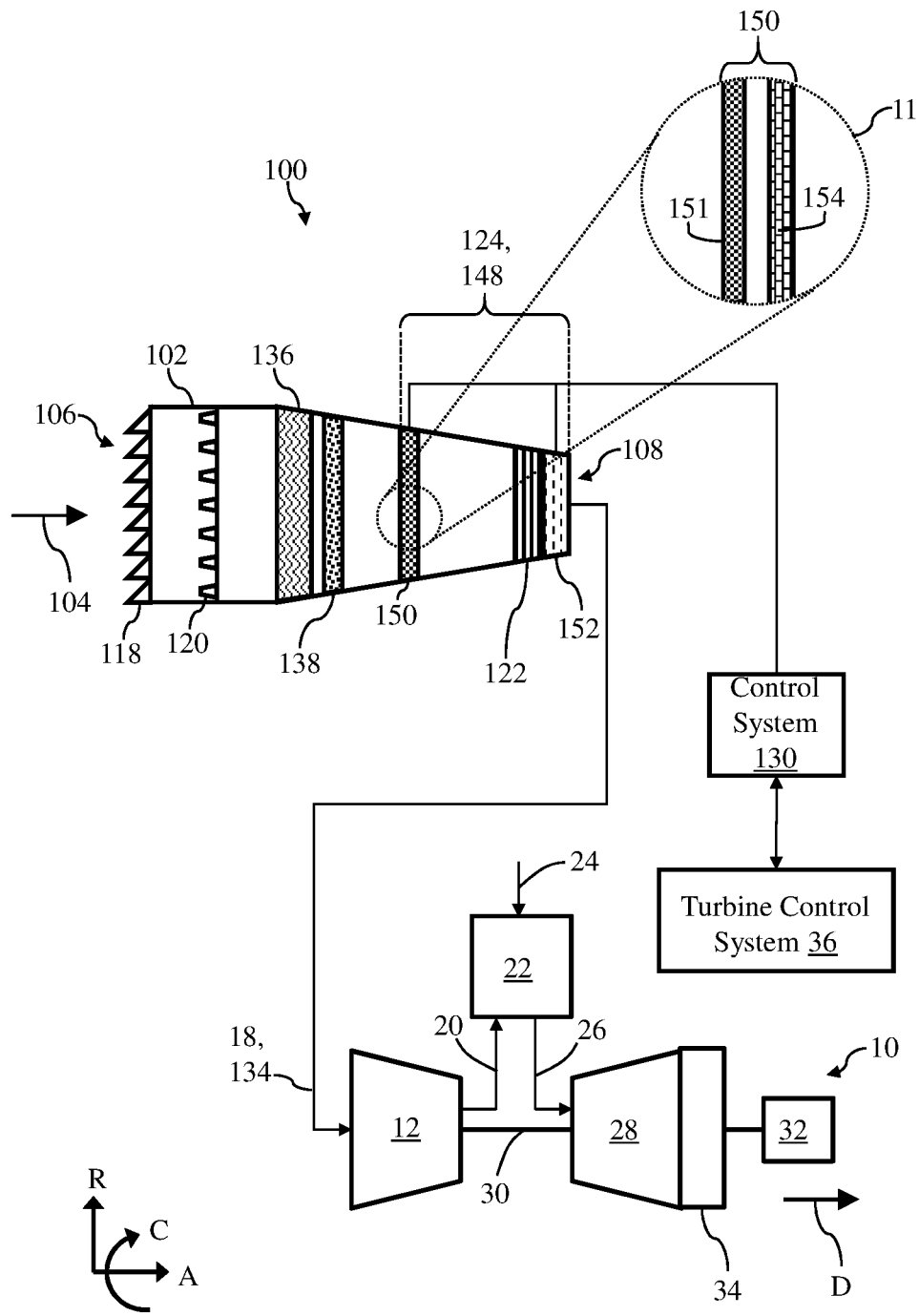

FIGS. 9-11 show various non-limiting examples of the matrix of electrostatic filters 148 being positioned within distinct locations of air inlet duct 102. For example, FIG. 9 shows the matrix of electrostatic filters 148 being positioned within air inlet duct 102 upstream of evaporator 136 and droplet removal 138. More specifically, the plurality of electrostatic filter cells 150 including ionizer 151, collector plate(s) 152, and measurement device 154 (see e.g., FIGS. 5, 7, and/or 8) may all be positioned within internal cavity 110 of air inlet duct 102, upstream of evaporator 136 and droplet removal 138. In this non-limiting example, all particles 112 may flow through and/or past the matrix of electrostatic filters 148 prior to flowing to and/or through evaporator 136 and droplet remover 138, respectively.

In the non-limiting example shown in FIG. 10, the matrix of electrostatic filters 148 may be positioned within air inlet duct 102 downstream of evaporator 136, but upstream of droplet removal 138. More specifically, the plurality of electrostatic filter cells 150 including ionizer 151, collector plate(s) 152, and measurement device 154 (see e.g., FIGS. 5, 7, and/or 8), may all be positioned within internal cavity 110 of air inlet duct 102 between evaporator 136 and droplet removal 138. In this non-limiting example, all particles 112 may flow through and/or past the matrix of electrostatic filters 148 after flowing through evaporator 136, but before flowing through droplet remover 138.

In the non-limiting example shown FIG. 11, collector plate(s) 152 may be positioned within and/or formed integral with silencer assembly 122. That is, collector plate(s) 152 of the matrix of electrostatic filters 148 may be distinct from and/or may be a stand-alone component than the plurality of electrostatic filter cells 150, and may be formed and/or positioned within silencer assembly 122, downstream of the plurality of electrostatic filter cells 150 including ionizer 151 and measurement device 154 (see, insert 11 in FIG. 11). In the non-limiting example, ionizer 151 and measurement device 154 forming the plurality of electrostatic filter cells 150 may be positioned downstream of evaporator 136 and droplet remover 138, respectively, and upstream of silencer assembly 122. Charged particles 112 may flow from the plurality of electrostatic filter cells 150 to silencer assembly 122 and may undergo the filtration process performed by collector plate(s) 152 simultaneous too, or nearly simultaneous to performing the silencing process on intake air 104 by silencer assembly 122, before filtered air 18 is provided to compressor 12.

Figure 12:
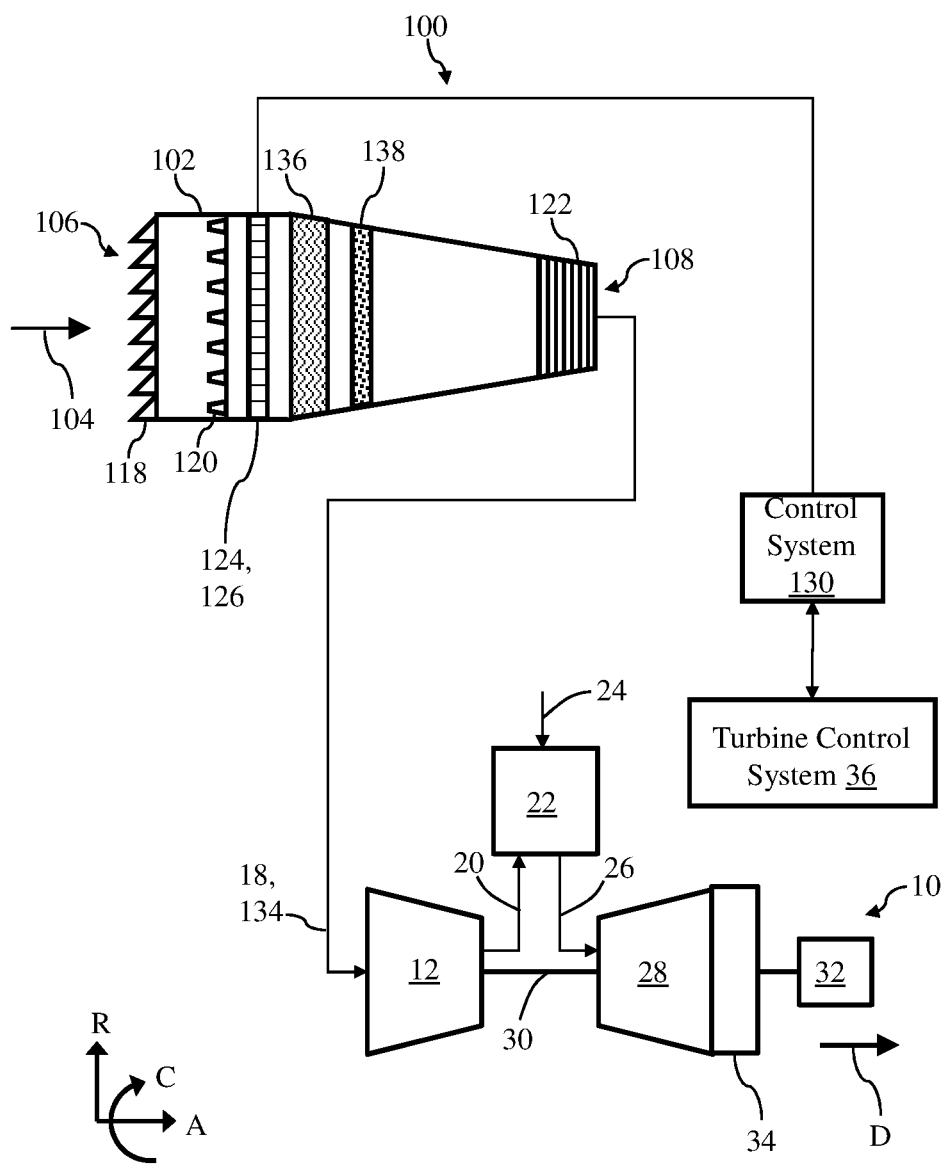
FIG. 12 shows a schematic view of a gas turbine system and an air infiltration assembly including a matrix of ionizers, according to another embodiment of the disclosure.

FIG. 12 shows another non-limiting example of gas turbine system 10 including air filtration assembly 100. In the non-limiting example, and similar to the non-limiting example shown and discussed herein with respect to FIGS. 1 and 2, air filtration assembly 100 may include electrostatic component 124 formed as matrix of ionizers 126. Also similar to the embodiments discussed herein, the matrix of ionizers 126 may include a plurality of ionizer cells 128 (see e.g., FIG. 2) operably coupled and/or in operable communication with control system 130. In a non-limiting example, control system 130 may maintain and/or operate each of the plurality of ionizer cells 128 forming the matrix of ionizers 126 at the same charge or voltage while particles 112 flow downstream of the array of fabric filters 120 and through the matrix of ionizers 126. Alternatively, and as similarly discussed herein with respect to FIGS. 1 and 2, control system 130 may operate each of the plurality of ionizer cells 128 forming the matrix of ionizers 126 operated at distinct voltages. The distinct charges and/or voltages may be dependent on the amount, concentration, and/or size of particles 112 flowing through the matrix of ionizers 126. For example, control system 130 may operate one of the plurality of ionizer cells 128 at a higher voltage than the remaining ionizer cells 128 due to the presence of particles 112 flowing through that specific ionizer cell 128, and/or the amount, concentration, and/or size of particles 112 flowing through the specific ionizer cell 128. Control system 130 may detect particles 112 within air inlet duct 102 by identifying when a breakthrough or breakdown voltage occurs or is altered in one of the pluralities of ionizer cells 128. As discussed herein, increasing the ionizer voltage to particles 112 by the plurality of ionizer cells 128 may increase the removal and/or filtration of particles 112 downstream of the matrix of ionizers 126.

Additionally, the matrix of ionizers 126 may including the plurality of ionizer cells 128 may be positioned upstream of evaporator 136. In the non-limiting example shown in FIG. 12, evaporator 136 may be formed and/or may include wetted fabric, a drop spray system, or any other suitable component that may perform the evaporative process by saturating intake air 104 and/or particles 112. By positioning the matrix of ionizers 126 upstream of evaporator 136, and forming evaporator 136 to include wetted fabric or a drop spray system, filtration and/or removal of particles 112 from intake air may be improved. That is, charging particles 112 of intake air 104 using the matrix of ionizers 126, and subsequently passing the charged particles 112 through evaporator 136 including wetted fabric or a drop spray system may increase and/or improve filtration of charged particles 113 because the charged particles are more attracted by the water droplets or moisture generated by evaporator 136 due to electrophoretic forces. As such, more particles 112 that may undesirably flow past the array of fabric filters 120 may be removed and/or filtered from intake air 104 using the matrix of ionizers 126 and evaporator 136, as shown in FIG. 12.

Although discussed herein as being formed in air inlet duct 102, it is understood that at least a portion of the components of air filtration assembly 100 discussed herein with respect to FIGS. 1-12 may be positioned within and/or directly downstream of distinct portions and/or components of gas turbine system 10. For example, at least a portion of air filtration assembly 100 may be positioned within combustor 22 and/or downstream compressor 12 to filter particles 112 from the fluid (e.g., air) utilized by combustor 22, as discussed herein.

Technical effects of the disclosure include providing air filtration assemblies for detecting undesirable particles that may flow downstream of damaged or defective filtration components, as well as improving filtration of the undesirable particles in air filtration assemblies that include damaged or defective filtration components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An air filtration assembly for a gas turbine system, the air filtration assembly comprising:
   an air inlet duct in fluid communication with a compressor of the gas turbine system, the air inlet duct including:
   an inlet for receiving intake air including intake air particles; and
   an outlet positioned opposite the inlet;

a plurality of vane filters at the inlet of the air inlet duct;

an array of fabric filters positioned in the air inlet duct, downstream of the plurality of vane filters;

a silencer assembly positioned in the air inlet duct, downstream of the array of fabric filters, the silencer assembly positioned adjacent the outlet of the inlet duct; and an electrostatic component positioned in the air inlet duct, downstream of the array of fabric filters, the electrostatic component configured to charge the intake air particles that pass through the plurality of vane filters and the array of fabric filters, the electrostatic component includes a matrix of ionizers spanning over a front cross-sectional area of the inlet duct, downstream of the array of fabric filters, the matrix of ionizers includes a plurality of ionizer cells positioned in the inlet duct, wherein during operation of the gas turbine system each of the plurality of ionizer cells operates at a distinct, predetermined voltage to provide a distinct charge to the air intake particles as the air intake particles flow past each of the plurality of ionizer cells.

2. The air filtration assembly of claim 1, wherein the electrostatic component further includes:

a matrix of electrostatic filters spanning over the front cross-sectional area of the inlet duct, downstream of the array of fabric filters.

3. The air filtration assembly of claim 2, wherein the matrix of electrostatic filters includes:

a plurality of electrostatic filter cells positioned in the inlet duct, each of the plurality of electrostatic filter cells including:

at least one ionizer of the matrix of ionizers, and, and at least one collector plate positioned downstream of the at least one ionizer.

4. The air filtration assembly of claim 3, further comprising:

a control system operably coupled to each of the plurality of electrostatic filter cells of the matrix of electrostatic filters; and a measurement device operably coupled to the control system, the measurement device positioned in the inlet duct downstream or upstream of the at least one collector plate of the plurality of electrostatic filter cells, wherein the control system is configured to:

detect a concentration of the air intake particles flowing through the inlet duct using the measurement device;

determine a position of the air intake particles flowing through the inlet duct using the measurement device; and identify at least one electrostatic filter cell of the plurality of electrostatic filter cells that receives the air intake particles based on the determined position of the air intake particles.

5. The air filtration assembly of claim 3, wherein the at least one collector plate is positioned in the silencer assembly.

6. The air filtration assembly of claim 1, further comprising:

a control system operably coupled to each of the plurality of ionizer cells of the matrix of ionizers, the control system configured to control the distinct, predetermined voltage for each of the plurality of ionizer cells; and at least one electrostatic sensor operably coupled to the control system, the at least one electrostatic sensor positioned downstream of the matrix of ionizers and configured to detect the air intake particles charged by the matrix of ionizers.

7. The air filtration assembly of claim 6, wherein the at least one electrostatic sensor is at least one of:

positioned downstream of the outlet of the inlet duct and upstream of the compressor of the gas turbine system, or in communication with an evaporator positioned in the inlet duct, downstream of the array of fabric filters.

8. The air filtration assembly of claim 1, further comprising:

an evaporator positioned in the inlet duct, downstream of the array of fabric filters; and a droplet remover positioned in the inlet duct, downstream of and directly adjacent to the evaporator, wherein the matrix of ionizers is positioned upstream of the evaporator, or downstream of the droplet remover.

9. The air filtration assembly of claim 1, further comprising:

an access door in the inlet duct, downstream of the matrix of ionizers; and at least one auxiliary ionizer, distinct from the matrix of ionizers, the at least one auxiliary ionizer positioned adjacent to and downstream of the access door for providing a charge to leaked air entering the inlet duct via the access door.

10. The air filtration assembly of claim 1, further comprising:

an evaporator positioned in the inlet duct, downstream of the array of fabric filters, wherein the matrix of electrostatic filters is positioned upstream of the evaporator, or downstream of the evaporator.

11. The air filtration assembly of claim 10, further comprising:

a droplet remover positioned in the inlet duct, downstream of the evaporator, wherein the matrix of electrostatic filters is positioned upstream of the droplet remover, or downstream of the droplet remover.

12. A gas turbine system comprising:

a compressor; and an air filtration assembly in fluid communication with the compressor, the air filtration assembly including:

an air inlet duct including:

an inlet for receiving intake air including intake air particles; and an outlet positioned opposite the inlet;

a plurality of vane filters at the inlet of the air inlet duct;

an array of fabric filters positioned in the air inlet duct, downstream of the plurality of vane filters;

a silencer assembly positioned in the air inlet duct, downstream of the array of fabric filters, the silencer assembly positioned adjacent the outlet of the inlet duct; and an electrostatic component positioned in the air inlet duct, downstream of the array of fabric filters, the electrostatic component configured to charge the intake air particles that pass through the plurality of vane filters and the array of fabric filters, wherein the electrostatic component of the air filtration assembly includes a matrix of ionizers spanning over a front cross-sectional area of the inlet duct, downstream of the array of fabric filters, the matrix of ionizers including:

a plurality of ionizer cells positioned in the inlet duct, wherein during operation of the compressor each of the plurality of ionizer cells operates at a distinct, predetermined voltage to provide a distinct charge to the air intake particles as the intake air particles flow past each of the plurality of ionizer cells.

13. The gas turbine system of claim 12, wherein the air filtration assembly further includes:
an evaporator positioned in the inlet duct, downstream of the array of fabric filters; and
a droplet remover positioned in the inlet duct, downstream of and directly adjacent to the evaporator,
wherein the plurality of ionizer cells of the matrix of ionizers are positioned upstream of the evaporator, or downstream of the droplet remover.

14. A gas turbine system comprising:
a compressor; and
an air filtration assembly in fluid communication with the compressor, the air filtration assembly including:
an air inlet duct including:
an inlet for receiving intake air including intake air particles; and
an outlet positioned opposite the inlet;
a plurality of vane filters at the inlet of the air inlet duct;
an array of fabric filters positioned in the air inlet duct, downstream of the plurality of vane filters;
a silencer assembly positioned in the air inlet duct, downstream of the array of fabric filters, the silencer assembly positioned adjacent the outlet of the inlet duct; and
an electrostatic component positioned in the air inlet duct, downstream of the array of fabric filters, the electrostatic component configured to charge the intake air particles that pass through the plurality of vane filters and the array of fabric filters,
wherein the electrostatic component of the air filtration assembly includes:
a matrix of electrostatic filters spanning over a front cross-sectional area of the inlet duct, downstream of the array of fabric filters, and the matrix of electrostatic filters includes a plurality of electrostatic filter cells positioned in the inlet duct, each of the plurality of electrostatic filter cells including:
at least one ionizer, and
at least one collector plate positioned downstream of the at least one ionizer of the plurality of electrostatic filter cells.

15. The gas turbine system of claim 14, wherein the air filtration assembly further includes:
an evaporator positioned in the inlet duct, downstream of the array of fabric filters,
wherein the plurality of electrostatic filter cells of the matrix of electrostatic filters are positioned upstream of the evaporator, or downstream of the evaporator.

16. The gas turbine system of claim 15, wherein the air filtration assembly further includes:
a droplet remover positioned in the inlet duct, downstream of the evaporator,
wherein the plurality of electrostatic filter cells of the matrix of electrostatic filters are positioned upstream of the droplet remover, or downstream of the droplet remover.

17. A method for filtering intake air for a gas turbine system, the method comprising:
flowing the intake air including intake air particles through:
a plurality of vane filters positioned at an inlet of an air inlet duct in fluid communication with a compressor of the gas turbine system, and
an array of fabric filters positioned in the air inlet duct, downstream of the plurality of vane filters; and
charging the intake air particles included in the intake air flowing through the plurality of vane filters and the array of fabric filters using an electrostatic component positioned in the air inlet duct, downstream of the array of fabric filters, the method further including:
detecting a concentration of the air intake particles flowing through the air inlet duct using a measurement device;
determining a position of the air intake particles flowing through the air inlet duct using the measurement device; and
identifying at least one electrostatic filter cell of a plurality of electrostatic filter cells forming the electrostatic component that receives the air intake particles based on the determined position of the air intake particles.

* * * * *